(12) United States Patent
Gruber et al.

(10) Patent No.: US 11,474,586 B2
(45) Date of Patent: *Oct. 18, 2022

(54) USER-CONFIGURABLE PERSON DETECTION SYSTEM, METHOD AND APPARATUS

(71) Applicant: ECOLINK INTELLIGENT TECHNOLOGY, INC., Carlsbad, CA (US)

(72) Inventors: Brandon Gruber, Carlsbad, CA (US); George Seelman, Temecula, CA (US)

(73) Assignee: ECOLINK INTELLIGENT TECHNOLOGY, INC., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/198,444

(22) Filed: Mar. 11, 2021

(65) Prior Publication Data

US 2021/0278890 A1    Sep. 9, 2021

Related U.S. Application Data

(62) Division of application No. 16/237,144, filed on Dec. 31, 2018, now Pat. No. 10,948,965.

(51) Int. Cl.
| | | |
|---|---|---|
| *G06F 1/32* | (2019.01) | |
| *G06F 1/3231* | (2019.01) | |
| *G08B 13/196* | (2006.01) | |
| *G06F 1/3228* | (2019.01) | |

(52) U.S. Cl.
CPC .......... *G06F 1/3231* (2013.01); *G06F 1/3228* (2013.01); *G08B 13/1961* (2013.01); *G08B 13/19604* (2013.01)

(58) Field of Classification Search
CPC ..... G06F 1/32; G06F 9/44; G06F 1/12; G06F 1/28
See application file for complete search history.

(56) References Cited

U.S. PATENT DOCUMENTS

| | | | |
|---|---|---|---|
| 5,196,826 | A | 3/1993 | Whiting |
| 5,543,778 | A | 8/1996 | Stouffer |
| 5,903,217 | A | 5/1999 | Stanczak et al. |
| 5,986,357 | A | 11/1999 | Myron et al. |
| 6,057,764 | A | 5/2000 | Williams |
| 7,411,789 | B2 | 8/2008 | Elwell et al. |
| 7,873,849 | B2 | 1/2011 | Mucignat et al. |
| 8,665,090 | B2 | 3/2014 | Bull |

(Continued)

OTHER PUBLICATIONS

ISA/US, Int. Search Report and Written Opinion issued on PCT application No. PCT/US17/54706, dated Oct. 19, 2017, 9 pages.

(Continued)

*Primary Examiner* — Keshab R Pandey
(74) *Attorney, Agent, or Firm* — Greenberg Traurig, LLP

(57) ABSTRACT

A system, method and apparatus for configuring a person detection sensor. The person detection sensor may limit its transmissions in accordance with a pre-configured dwell time. The person detection sensor may receive a new dwell time from a personal communication device. When the new dwell time is received, it is stored in memory and is then used to regulate the number of transmissions of the person detection sensor in accordance with the new dwell time.

14 Claims, 5 Drawing Sheets

(56) References Cited

U.S. PATENT DOCUMENTS

| | | |
|---|---|---|
| 8,842,008 B2 | 9/2014 | Bull |
| 9,589,446 B1 | 3/2017 | Dey |
| 9,615,428 B2 | 4/2017 | King |
| 9,756,607 B1 | 9/2017 | DeLuca |
| 10,354,503 B1 | 7/2019 | Kostrun et al. |
| 10,492,261 B2 | 11/2019 | Chen |
| 2002/0067272 A1 | 6/2002 | Lemelson et al. |
| 2002/0089489 A1 | 7/2002 | Carpenter |
| 2002/0175815 A1 | 11/2002 | Baldwin |
| 2004/0090327 A1 | 5/2004 | Soloway |
| 2005/0228317 A1 | 10/2005 | Mathews |
| 2008/0291036 A1 | 11/2008 | Richmond |
| 2009/0086683 A1 | 4/2009 | Pendergrass et al. |
| 2009/0146846 A1 | 6/2009 | Grossman |
| 2009/0196206 A1 | 8/2009 | Weaver et al. |
| 2010/0019911 A1 | 1/2010 | Chen |
| 2012/0019644 A1 | 1/2012 | Hamabashiri et al. |
| 2012/0297226 A1 | 11/2012 | Mucignat et al. |
| 2012/0315839 A1 | 12/2012 | Mumcuoglu et al. |
| 2013/0267253 A1 | 10/2013 | Case et al. |
| 2014/0118592 A1 | 5/2014 | Yoon et al. |
| 2014/0191862 A1 | 7/2014 | Haines |
| 2015/0113338 A1 | 4/2015 | Maruyama et al. |
| 2016/0003493 A1 | 1/2016 | Katz |
| 2016/0126733 A1 | 5/2016 | Hick et al. |
| 2016/0150121 A1* | 5/2016 | Idehara .............. G06V 40/103 358/1.15 |
| 2016/0241997 A1* | 8/2016 | Lucas .................. G06Q 20/34 |
| 2017/0013069 A1 | 1/2017 | Grohman |
| 2017/0092112 A1 | 3/2017 | Khazanov et al. |
| 2017/0160428 A1 | 6/2017 | Kumar |
| 2017/0316680 A1 | 11/2017 | Lamb et al. |
| 2018/0012467 A1 | 1/2018 | Chen |
| 2018/0074152 A1 | 3/2018 | Bowden |
| 2018/0322752 A1* | 11/2018 | Chen .................. G08B 13/1627 |
| 2018/0338472 A1* | 11/2018 | Kinsley .............. A01K 27/009 |
| 2019/0141812 A1 | 5/2019 | Chen |
| 2020/0209943 A1 | 7/2020 | Gruber et al. |
| 2020/0294382 A1 | 9/2020 | Pradhan et al. |

OTHER PUBLICATIONS

ISA/US, Int. Search Report and Written Opinion issued on PCT application No. PCT/US21/19185, dated Mar. 26, 2021, 7 pages.

ISA/US, Int. Sear Report and Written Opinion issued on PCT application No. PCT/US20/21177, dated Jun. 15, 2020, 13 pages.

ISA/US, Int. Search Report and Written Opinion issued on PCT application No. US19/57130, dated Jan. 16, 2020, 10 pgs.

* cited by examiner

USER-CONFIGURABLE PERSON DETECTION SYSTEM, METHOD AND APPARATUS

CROSS-REFERENCE TO RELATED APPLICATIONS

The present application is a divisional of U.S. patent application Ser. No. 16/237,144, filed on Dec. 31, 2018.

BACKGROUND

Field of the Invention

The present invention relates to home security and, more particularly, to a system, method and apparatus to extend battery life for home security sensors.

Description of Related Art

Home security systems are very popular in the United States and abroad. Such home security systems typically comprise a security panel and a number of sensors distributed around the home to detect unauthorized entry and/or movement inside the home. For example, a home may have all of its doors and windows monitored by installing a wireless door/window sensor onto each door and window of the home to detect unauthorized entry, and one or more motion sensors installed at one or more points inside the home for detecting unauthorized movement within the home. Each of the sensors may transmit a wireless signal to the security panel, where the security panel may take further action once a signal has been received from one of the sensors, such as to sound a siren inside the home or contact a remote monitoring facility.

In addition to the popularity of home security systems, home monitoring and control systems are now becoming widespread. Such systems allow users to monitor their home security systems, turn lights on and off remotely, lock and unlock doors remotely, as well as to better control home heating and air conditioning systems. In the latter category, battery-powered, home occupancy sensors are being used to automatically control operation of heating and air conditioning systems when the sensors detect the presence of an occupant or not.

Occupancy sensors may suffer from greater battery drainage than motion sensors, due to the fact that occupancy sensors transmit a signal every time occupancy is sensed. In contrast, motion sensors typically limit the number of transmissions by using a preset "dwell time", usually on the order of between three and four minutes, that restricts transmission to once per dwell time. Thus, the batteries in motion sensors tend to last longer than batteries in occupancy sensors. This problem is exacerbated when an occupancy sensor is placed in a high-traffic area, such as an entry hallway or kitchen, for example. While battery life is usually better for motion sensors, a tradeoff occurs between battery life and an accurate ability to know when a person is present or not.

Given that both motion sensors and occupancy sensors determine the presence of people, and given the expense to purchase both types of sensors, it might be desirable to use a motion sensor as a dual-purpose sensor: a security motion sensor and an occupancy sensor. However, given the relatively long dwell time of motion sensors, accurate occupancy determinations may suffer, as the dwell time prevents occupancy updates on a continuous basis.

It would be desirable, then, to combine traditional, battery-powered motion sensors with occupancy sensors to eliminate the need to purchase both types of sensors, and to reduce the number of battery-powered devices in a home.

SUMMARY

A system, method and apparatus for configuring a person detection device is described herein. In one embodiment, an apparatus is described for configuring a dwell time of the apparatus, comprising a detector for detecting a presence of a person in an area, a memory for storing processor-executable instructions and the dwell time, a transceiver for sending and receiving wireless signals, a processer coupled to the detector, the memory and the transceiver, for executing the processor-executable instructions that causes the apparatus to receive, by the processor via the transceiver, a command from a personal communication device to change the dwell time, the command comprising a new dwell time, in response to receiving the command from the personal communication device to change the dwell time, store, by the processor, the new dwell time in the memory, determine, by the processor via the detector, the presence of the person in the area, determine, by the processor, that a time greater than the new dwell time has elapsed since the transceiver previously transmitted a signal indicative of the presence of a person in the area, and when the processor determines that a time greater than the dwell time has elapsed since the transceiver previously transmitted a signal indicative of the presence of a person in the area, transmit, by the processor via the transceiver, a new signal indicative of the presence of the person in the area.

In another embodiment, a method for configuring a dwell time of a person detection device is described, comprising receiving, by a processor via a transceiver, a command from a personal communication device to change the dwell time of the person detection sensor, the command comprising a new dwell time, in response to receiving the command from the personal communication device to change the dwell time, storing the new dwell time in the memory, determining, by the processor via a detector, the presence of a person in an area monitored by the person detection sensor, determining, by the processor, that a time greater than the new dwell time has elapsed since the transceiver previously transmitted a signal indicative of the presence of a person in the area, and when the processor determines that a time greater than the dwell time has elapsed since the transceiver previously transmitted a signal indicative of the presence of a person in the area, transmitting, by the processor via the transceiver, a new signal indicative of the presence of the person in the area.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION

This disclosure describes a person detection device specially configured to act as either a security motion sensor, a home automation occupancy sensor, or both. The motion sensor is initialized using an "app" on a device that allows a dwell time of the motion sensor to be adjusted in accordance with a function (i.e., security vs. occupancy) and a particular location where the sensor is installed.

Figure 1:
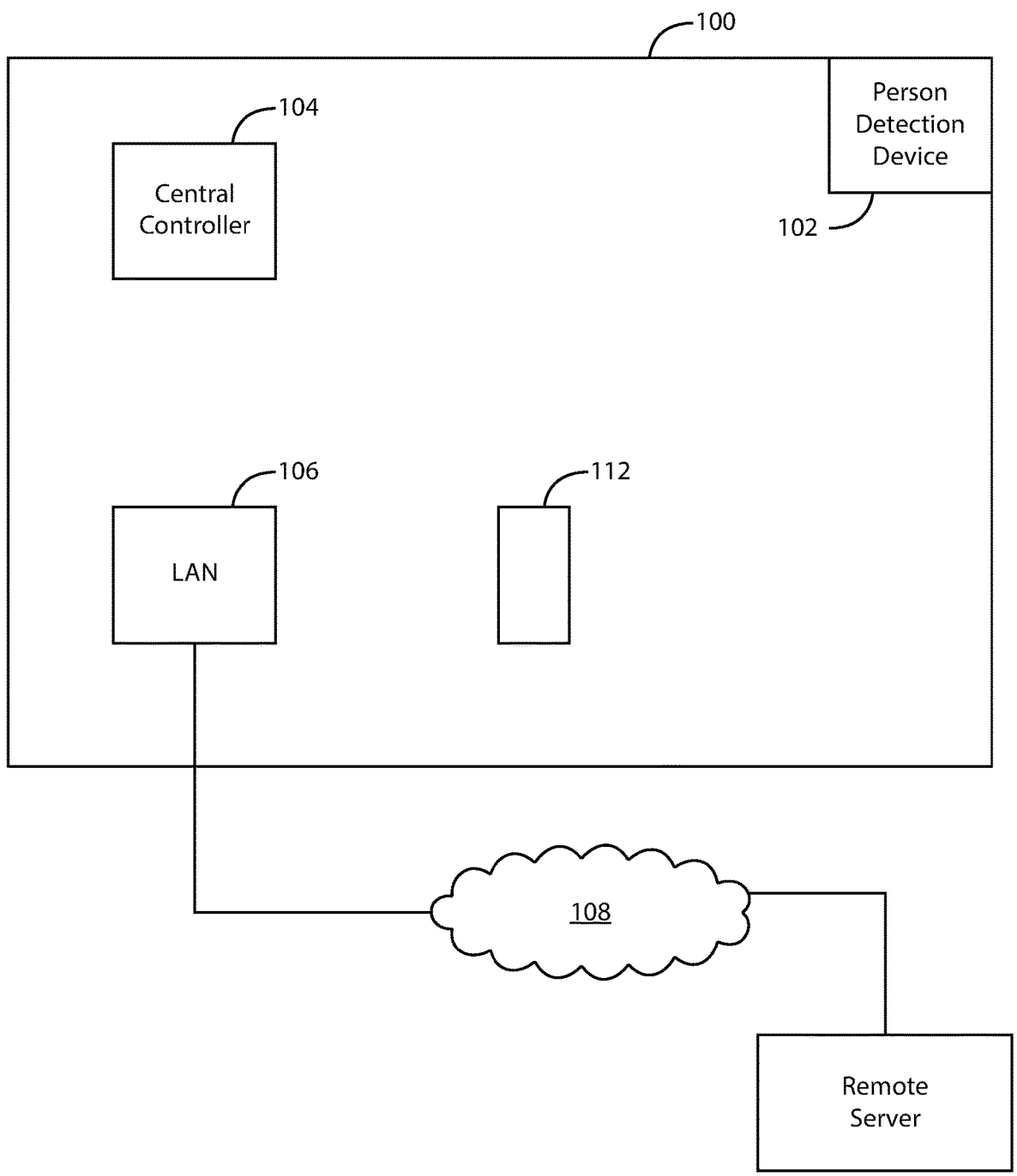
FIG. 1 illustrates one embodiment of a system for configuring a dwell time of a person detection device used to monitor an area in a home or business.

FIG. 1 illustrates a top, plan view of a system for configuring a dwell time of a person detection device 102 used to monitor an area 100 in a home or business. Area 100 generally comprises a room, hallway, entryway, or some other portion of a residence or business. Person detection device 102 comprises a sensor for determining the presence, and/or absence, of one or more persons in area 100 in accordance with the teachings herein. Person detection device 102 may comprise a battery-powered motion sensor using passive infra-red (PIR) detection techniques, as known in the art, to detect infra-red heat as a person moves across area 100. Person detection device 102 may, alternatively or in combination, comprise an occupancy sensor, used to determine the presence of one or more persons in area 100 using techniques such as ultrasonic, infra-red, thermal, or other well-known techniques to determine if a person is occupying area 100. Unlike traditional motion (PIR) sensors, occupancy sensors generally do not require movement of a person in order to detect their presence.

Person detection device 102 may transmit a signal indicative of the presence of a person to a personal communication device, such as to central controller 104, upon detection of a person in area 100, in accordance with an adjustable dwell time stored within person detection device 102, as will be explained in greater detail later herein. Central controller 104 comprises a home security panel, gateway, hub or some other device that monitors person detection device 102, as well as other sensors and/or home monitoring and control devices, installed within area 100 or other areas of a home or business. Examples of central controller 104 include a GC3 Security & Control panel sold by Nortek Security and Control, Inc., a base station sold as part of an alarm security kit by Ring, Inc., a Pulse® interactive touch screen panel sold by ADT, Inc. In other embodiments, controller 104 may not be used. In these embodiments, person detection device 102 is monitored by a remote server 110 in communication with person detection device 102 via a wide-area network 108, such as the Internet, and a local-area network (LAN) 106. In the remaining disclosure, any reference to central controller 104 may include reference to remote server 110. In some embodiments, central controller 104 comprises both security and home monitoring and control functionality. Finally, central controller 104 may communicate with remote server 110 via local-area network 106 and wide-area network 108 where central controller 104 lacks independent means to send alerts or other information externally to area 100.

When central controller 104 receives a signal from person detection device 102, or some other security or home monitoring sensor, central controller 104 may perform one or more actions, such as to contact a remote, security monitoring facility (not shown) via wide-area network 108, or by some other means, such as via cellular communication technology. Alternatively, or in addition, central controller 104 may cause a siren (not shown) inside of area 100, or elsewhere in another location inside a home or business, to sound, and/or a strobe light (not shown) to flash.

Person detection device 102 may be programmed remotely using a personal communication device 112. personal communication device 112 may comprise a fixed or mobile computing device, such as a laptop or desktop computer, or it may comprise a mobile phone, tablet computer, wearable device, or some other device capable of wireless communications with person detection device 102, either directly or indirectly via local-area network 106 and/or wide-area network 108 (when personal communication device 112 is located outside of area 100 and out of range of local-area network 106) and also offering a user interface for programming person detection device 102. personal communication device 112 is configured to run an executable software program that allows a user to program person detection device 102. personal communication device 112 typically provides a user interface, where at least a dwell time of person detection device 102 may be changed. In one embodiment, personal communication device 112 communicates with remote server 110, which stores account information for thousands, or millions, or users, each who have one or more person detection devices in their respective homes or businesses. In this embodiment, a user account may store a current dwell time of person detection device 102 as provided by a user via personal communication device 112. The dwell time may then be provided to person detection device 102.

Figure 2:
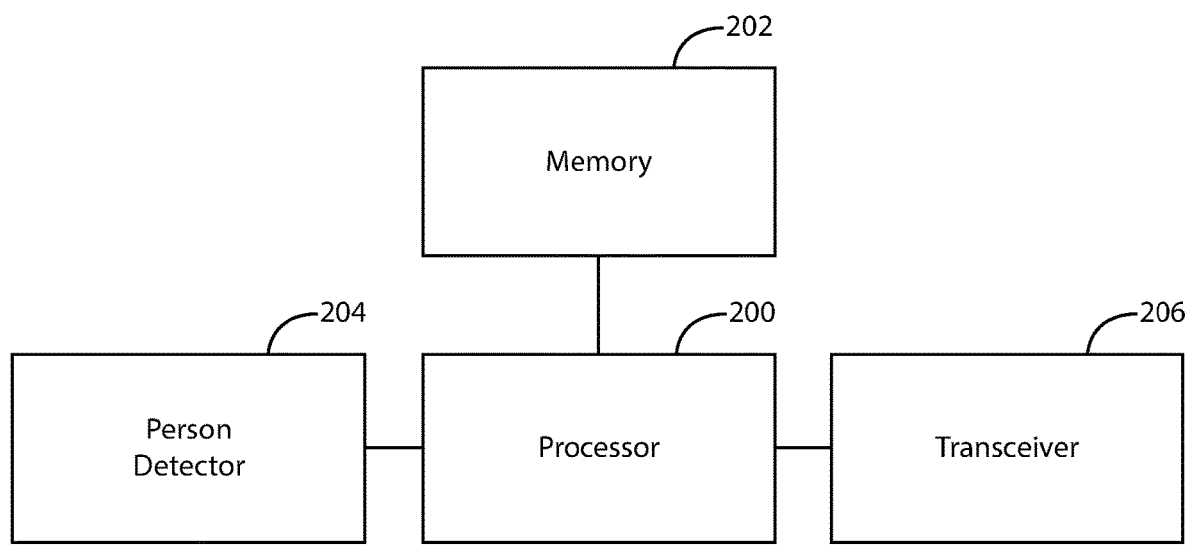
FIG. 2 is a functional block diagram of the person detection device as shown in FIG. 1.

FIG. 2 is a functional block diagram of one embodiment of person detection device 102. In this embodiment, person detection device 102 comprises a processor 200, a memory 202, a person detector 204, and a transceiver 206. It should be understood that the functional blocks may be connected to one another in a variety of ways, that additional function blocks may be used (for example, amplification or filtering), and that not all functional blocks necessary for operation of person detection device 102 are shown for purposes of clarity, such as a power supply.

Processor 200 is configured to provide general operation of person detection device 102 by executing processor-executable instructions stored in memory 202, for example, executable code. Processor 200 typically comprises a general purpose processor, such as an ADuC7024 analog microcontroller manufactured by Analog Devices, Inc. of Norwood Mass., although any one of a variety of microprocessors, microcomputers, microcontrollers, and/or custom ASICs selected based on size, cost, power consumption, computing power, and/or other factors.

Memory 202 is coupled to processor 200 and comprises one or more non-transitory, information storage devices, such as RAM, ROM, flash memory, or virtually any other type of electronic, optical, or mechanical information storage device. Memory 202 is used to store the processor-executable instructions for operation of person detection device 102 as well as any information used by processor 200, such as a dwell time that defines how often person detection device 102 may transmit when a person is detected. Memory device 202 could, alternatively or in addition, be part of processor 200, as in the case of a microcontroller comprising on-board memory.

Person detector 204 is coupled to processor 200 and comprises a sensor and related circuitry and, in some embodiments, firmware, to detect the presence or absence of one or more persons in area 100. Person detector 204 may comprise one or more passive infra-red (PIR) detectors (for detecting motion of an infra-red emitting body), ultrasonic detectors (for detecting a doppler shift from a reflected body), heat or thermal detectors (for determining a temperature change), carbon dioxide sensors (for detecting the presence of carbon dioxide), microwave sensors (for detecting a doppler shift from a reflected body), a keycard detector (for determining when a hotel guest has inserted a hotel key card), and/or a camera (using firmware to detect a shape in the form of a person).

Transceiver 206 is coupled to processor 200 and comprises circuitry necessary to transmit and receive wireless signals from central controller 104, local-area network 106 and/or personal communication device 112. Such circuitry is well known in the art and may comprise BlueTooth, Wi-Fi, Z-wave, Zigbee, X-10, RF, optical, or ultrasonic circuitry, among others.

Figure 3:
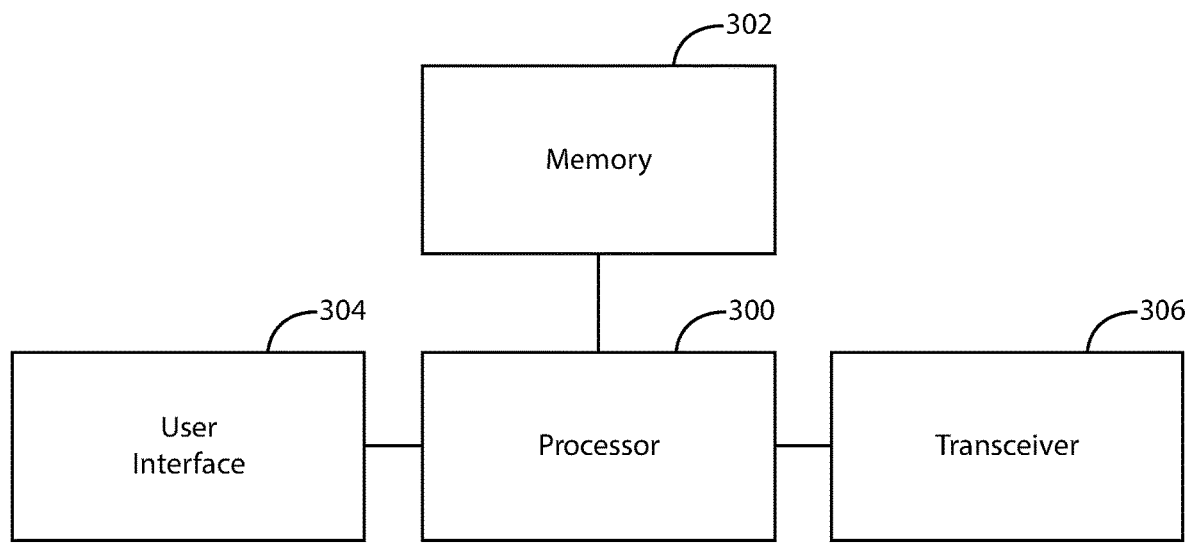
FIG. 3 is a functional block diagram of a personal communication device used to configure the person detection device as shown in FIG. 1.

FIG. 3 is a functional block diagram of one embodiment of personal communication device 112, showing processor 300, memory 302, user interface 304, and one or more transceivers 306. It should be understood that the functional blocks shown in FIG. 3 may be connected to one another in a variety of ways, and that not all functional blocks necessary for operation of personal communication device 112 are shown (such as a power supply), for purposes of clarity.

Processor 300 is configured to provide general operation of personal communication device 112 by executing processor-executable instructions stored in memory 200, for example, executable code. Processor 300 typically comprises one or more microprocessors, microcontrollers, or custom ASICs that provide communications functionality to personal communication device 112 as well as to execute instructions that provide an ability for personal communication device 112 to configure person detection device 102 to change the dwell time of person detection device 102.

Memory 302 is coupled to processor 300 and comprises one or more non-transient information storage devices, otherwise referred to as one or more processor-readable mediums, such as RAM, flash memory, or virtually any other type of electronic, optical, or mechanical information storage device. Memory 302 is used to store the processor-executable instructions for general operation of personal communication device 112 (for example, communication functionality) and for providing a user interface to a user for configuring person detection device 102 to change the dwell time of person detection device 102.

User interface 304 is coupled to processor 300 and allows a user to configure person detection device 102. User interface 304 may comprise one or more pushbuttons, touchscreen devices, electronic display devices, lights, LEDs, LCDs, biometric readers, switches, sensors, keypads, microphones, speakers, and/or other human interface devices that present indications to a user or generate electronic signals for use by processor 300 upon initiation by a user. A very popular user interface today is a touchscreen device.

Transceiver 206 comprises circuitry necessary to wirelessly transmit and receive information to/from personal communication device 112, such as one or more of a cellular transceiver, a Wi-fi transceiver, a Bluetooth transceiver, a cellular data transceiver, an Ethernet adapter, and/or some other type of wireless means for communications. In some embodiments, more than one transceiver is present, for example, a cellular transceiver and a Wi-Fi transceiver. Such circuitry is generally well known in the art.

Figure 4A:
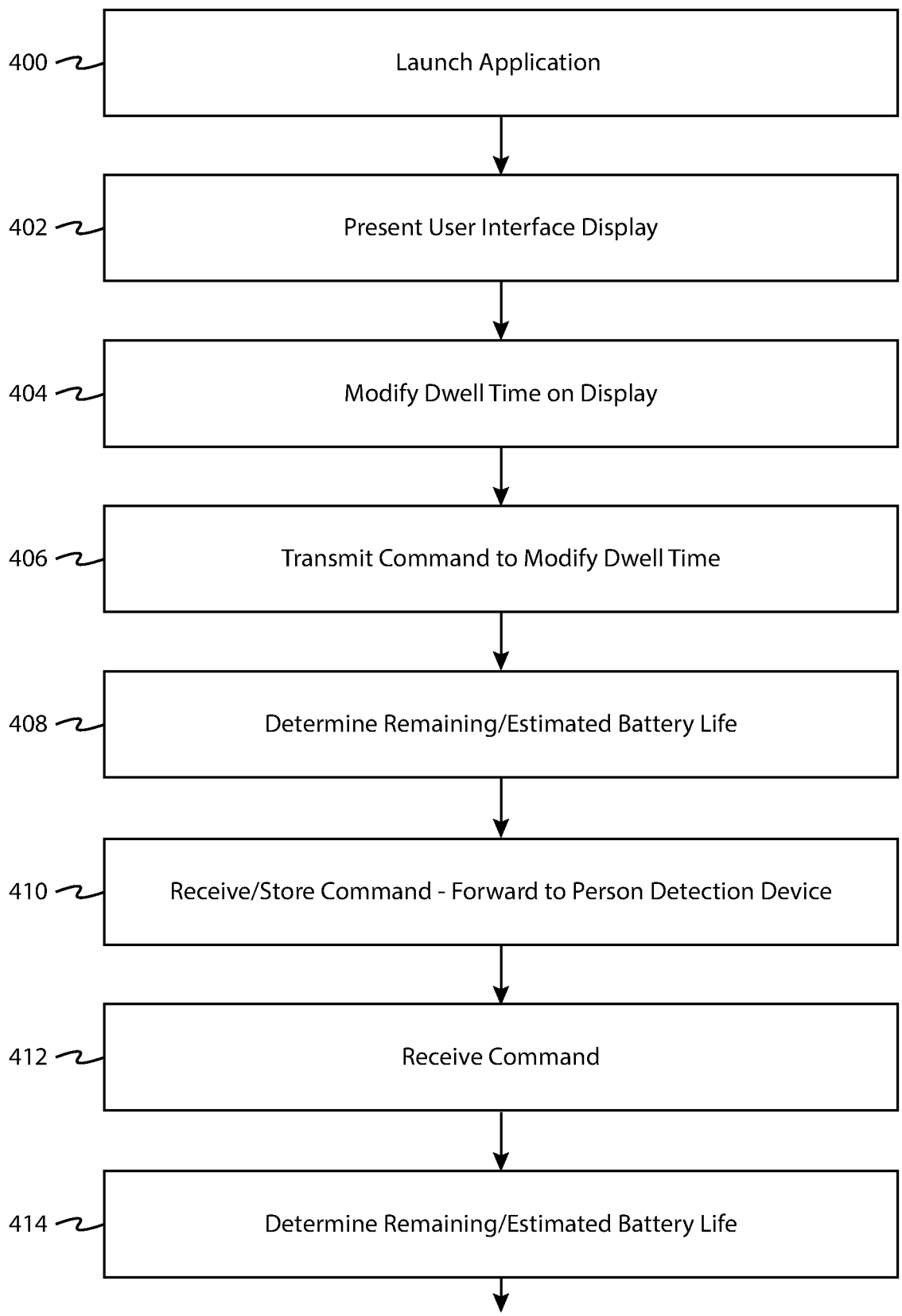
FIGS. 4A and 4B depict a flow diagram illustrating one embodiment of a method for configuring the person detection device as shown in FIGS. 1 and 2.
Figure 4B:
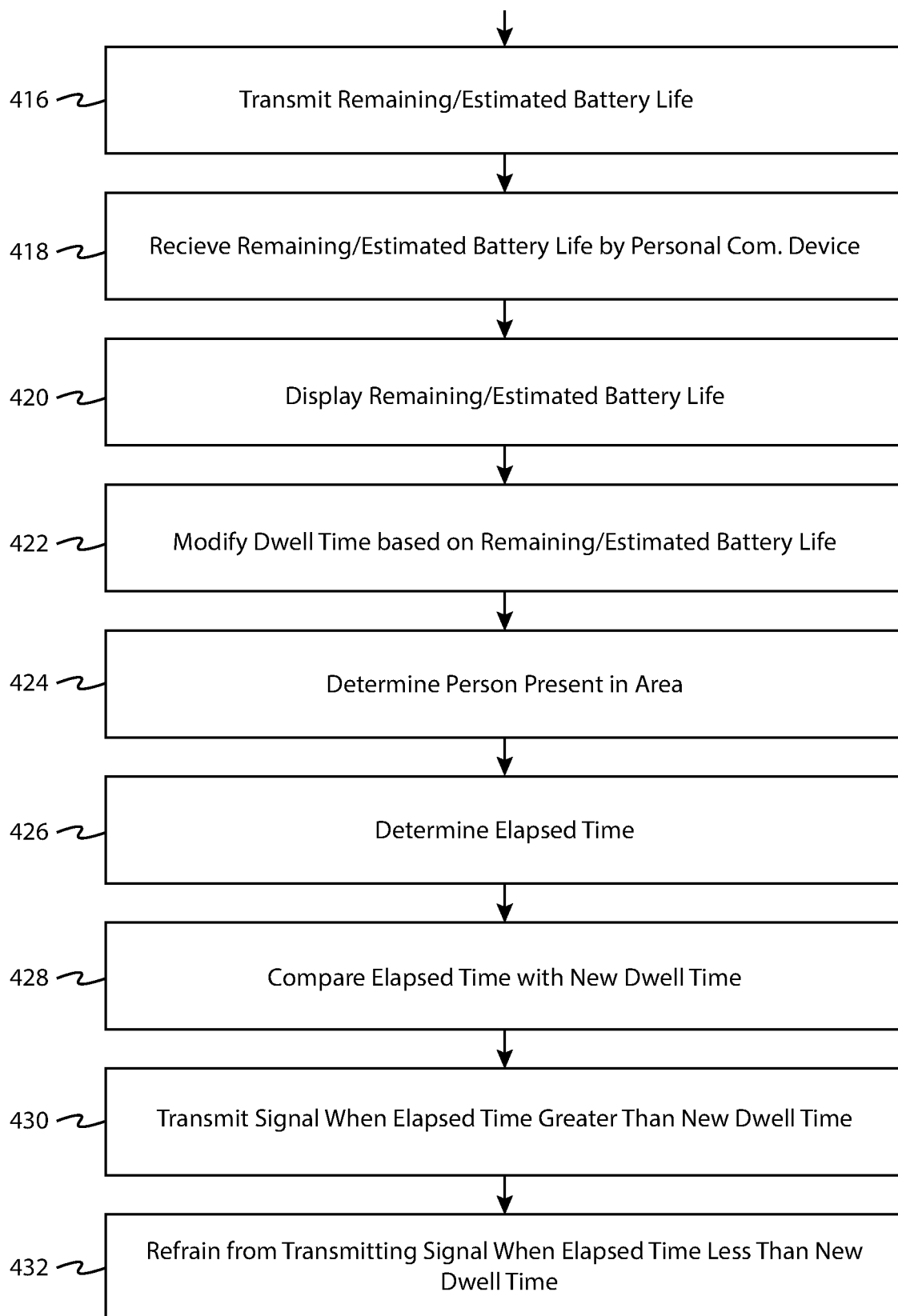

FIGS. 4A and 4B depict a flow diagram illustrating one embodiment of method, or algorithm, performed by person detection device 102 and personal communication device 112, for configuring a dwell time of person detection device 102. It should be understood that in some embodiments, not all of the steps shown in FIGS. 4A and 4B are performed and that the order in which the steps are carried out may be different in other embodiments. It should be further understood that some minor method steps have been omitted for purposes of clarity.

The process begins at block 400, where a user launches an application on personal communication device 112 to configure person detection device 102. The application may initiate a session with remote server 110 to access an account where information pertaining to person detection device 102, and associated information such as an owner's name, address, phone number, account number, email address, etc., may be stored. In other embodiments, personal communication device 112 communicates with person detection device 102 either directly (i.e., using Bluetooth or BLE), or indirectly (i.e., via local-area network 106).

At block 402, processor 300 of personal communication device 112 presents a user interface display to the user via user interface 304. The user interface display is typically a graphical user interface, allowing the user to determine a status of person detection device 102 (such as whether person detection device 102 is connected to central controller 104, an operating mode of person detection device (i.e., "walk test", normal), a current setting for the dwell time, an estimated battery life of person detection device 102, etc.) and also to allow the user to make certain modifications to person detection device 102 (i.e., to change the dwell time). The user interface display may comprise one or more drop-down menus, slider bars, entry boxes, etc. to allow the user to change the dwell time.

At block 404, the user modifies the dwell time using the user interface display on user interface 304. The user may wish to minimize the dwell time to, for example, 2 seconds, for purposes of conducting a "walk test". A walk test may be conducted upon initial installation of person detection device 102 on a wall or ceiling, by walking in front of person detection device 102 at various distances and angles, to see if person detection device 102 detects movement of the user. During such a walk test, it is desirable to quickly determine if person detection device is able to detect the user without having to wait several minutes, as would be the case with longer dwell times during a normal mode of operation. Thus, the dwell time may be reduced to something on the order of a few seconds during a walk test.

A user may wish to increase the dwell time of person detection device 102, for example to four minutes, when person detection device 102 will be used as a motion sensor. It is generally desirable to limit the number of transmissions of motion sensors; otherwise, each time that movement is detected, a transmission will occur, thus draining the battery relatively quickly. By changing the dwell time to 4 minutes, person detection device 102 is only capable of transmitting one motion detection signal every 4 minutes, thus saving battery life.

On the other hand, the user may wish to change the dwell time of person detection device 102, for example to one minute, when person detection device 102 will be used as an occupancy sensor. It is generally desirable that occupancy sensors be capable of transmitting occupancy/non-occupancy signals at more frequent intervals than motion sensors, in order to better know whether a room remains occupied for purposes of controlling lighting, heating/cooling, etc. By setting the dwell time at an intermediate time, such as between 30 seconds and two minutes, person detection device 102 acts more like an occupancy sensor, transmitting indications of movement/occupancy more often than with increased dwell times.

In any case, an indication of the new dwell time is provided from user interface 304 to processor 300.

At block 406, processor 300, in turn, generates a command to change the dwell time and causes the command to be transmitted to remote server 110 and/or person detection device 102, via transceiver 306, which may include an identification of a particular person detection device 102 to be modified. The command may include the new dwell time, or the new dwell time may be transmitted in a separate message or command. In another embodiment, the new dwell time is not provided to remote server 110 and/or person detection device 102 until the user is satisfied that the new dwell time will not have undesired battery life implications, as described below.

At block 408, in one embodiment, processor 300 may estimate a remaining or expected battery life of person detection device 102, using the new dwell time. The remaining battery life may take into account how long person detection device 102 has been installed, or how long since the battery(ies) of person detection device 102 was/were changed. The expected battery life may provide an estimate of the battery life assuming that new batteries have been installed. Memory 302 may receive a standard battery life of person detection device 102 via remote server 110 at some point during a setup process, identifying an expected battery life for a particular make and/or model of person detection device 102 at a default dwell time, such as two minutes. As the dwell time is increased from the default dwell time, processor 300 may estimate the remaining or expected battery life, based on the default battery life and the new dwell time. For example, if the expected battery life of person detection device 102 is 36 months using a dwell time of two minutes, and the dwell time is increased to 3 minutes, processor 300 may determine an estimated or expected battery life of 48 months, depending on factors such as the amount of power consumed by person detection device 102 during transmission of signals indicative of movement/occupancy once every 3 minutes. Similarly, an estimate of the remaining or expected battery life may be determined by processor 300 when the dwell time is decreased.

At block 410, remote server 110 may receive the command/new dwell time from personal communication device 112 and store the new dwell time in an associated database in accordance with the particular person detection device 102 identified by personal communication device 112. Remote server 110 may then forward the new dwell time to person detection device 102.

At block 412, processor 200 receives the command/new dwell time via transceiver 206. Processor 200 may determine that the command comprises an instruction to change a current dwell time store in memory 202 with the new dwell time by comparing the command to a plurality of commands, such as a command to reset person detection device 102, a command to provide the status of person detection device 102, a command to enter into a walk test mode of operation from a normal mode of operation, or other commands. When processor 200 determines that the command is a command to change the dwell time, processor 200 stores the new dwell time in memory 202.

At block 414, processor 200 may determine a remaining or expected battery life for the battery(ies) that power person detection device 102. In one embodiment, processor 200 measures a voltage of the battery(ies) as person detection device 200 transmits a signal, as current is drawn from the battery(ies) during transmission. The voltage level may be compared to an expected battery voltage when the battery(ies) are new, and the deviation from the expected battery voltage indicates a remaining battery life.

In another embodiment, memory 202 may receive a standard battery life of person detection device 102 via remote server 110 at some point during a setup process, identifying an expected battery life for a particular make and/or model of person detection device 102 at a default dwell time, such as two minutes. As the dwell time is increased from the default dwell time, processor 200 may estimate the remaining or expected battery life, based on the default battery life and the new dwell time. For example, if the expected battery life of person detection device 102 is 36 months using a dwell time of two minutes, and the dwell time is increased to 3 minutes, processor 200 may determine an estimated or expected battery life of 48 months, depending on factors such as the amount of power consumed by person detection device 102 during transmission of signals indicative of movement/occupancy once every 3 minutes. Similarly, an estimate of the remaining or expected battery life may be determined by processor 200 when the dwell time is decreased.

At block 416, processor 200 may transmit the remaining or expected battery life to remote server 110 and/or personal communication device 112 via transceiver 206.

At block 418, processor 300 in person detection device 102 receives the remaining battery life and may store the remaining battery life in memory 302.

At block 420, processor 300 may display the remaining battery life to the user via user interface 304 and the user interface display.

At block 422, the user may choose to again modify the dwell time if the user determines that the expected or remaining battery life is unacceptable to the user. In an embodiment where processor 300 determines the remaining or expected battery life, the new dwell time may not be provided to processor 300 until the user is satisfied that the new dwell time will not adversely affect the batter life more than the user may tolerate, but trying a variety of new dwell times, and only providing a final, new dwell time to processor 300, once the user is satisfied. This may be achieved by the user pressing a "submit" icon, or other, similar indication, displayed by user interface 304, once the user has selected a desired dwell time.

At block 424, at some later time, processor 200 determines that a person is present in area 100 by evaluating signals from person detector 204.

At block 426, processor 200 determines an elapsed time since a previous signal was transmitted, indicating that a person was within area 100.

At block 428, processor 200 compares the elapsed time from when a previous signal was transmitted to the new dwell time to determine if the elapsed time is greater than the new dwell time.

At block 430, if the elapsed time is greater or equal to the new dwell time, processor 200 causes a signal to be transmitted indicative of a person in area 100, via transceiver 206.

At block 432, if the elapsed time is less than the new dwell time, processor 200 refrains from causing a signal to be transmitted indicative of a person in area 100, and processor continues to evaluate signals from person detector 204 to determine if a person is present within area 100, where blocks 422-432 are repeated.

Therefore, having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. An apparatus for configuring a dwell time of the apparatus, comprising:
a detector for detecting a presence of a person in an area;
a memory for storing processor-executable instructions and the dwell time;
a transceiver for sending and receiving wireless signals; and
a processor coupled to the detector, the memory and the transceiver, for executing the processor-executable instructions that causes the apparatus to:
receive, by the processor via the transceiver, a command from a personal communication device to change the dwell time;
receive, by the processor via the transceiver, a new dwell time from the personal communication device;
in response to receiving the command and the new dwell time from the personal communication device, store, by the processor, the new dwell time in the memory;
determine, by the processor via the detector, the presence of the person in the area;
determine, by the processor, an elapsed time since the transceiver previously transmitted a signal indicative of the presence of a person in the area; and
when the processor determines that the elapsed time is less than the new dwell time, refrain, by the processor, from transmitting a new signal indicative of the presence of the person in the area.

2. The apparatus of claim 1, wherein the processor-executable instructions comprise further instructions that cause the apparatus to:
determine, by the processor, a second elapsed time since the transceiver previously transmitted a second signal indicative of the presence of the person in the area; and
when the processor determines that the second elapsed time is greater than the new dwell time, transmit, by the processor via the transceiver, a second new signal indicative of the presence of the person in the area.

3. The apparatus of claim 1, wherein the command comprises an instruction to increase or decrease the dwell time by a predetermined amount.

4. The apparatus of claim 1, wherein the new dwell time comprises a time period.

5. The apparatus of claim 4, wherein the processor-executable instructions comprise further instructions that cause the apparatus to:
compare, by the processor, the time period to an upper dwell time threshold stored in the memory;
determine, by the processor, that the time period exceeds the upper dwell time threshold; and
transmit, by the processor via the transceiver, an error message to the personal communication device when the processor determines that the time period exceeds the upper dwell time threshold.

6. The apparatus of claim 1, wherein the processor-executable instructions comprise further instructions that cause the person detection device to:
measure, by the processor, a remaining battery life of a battery used to power the apparatus; and
transmit, by the processor via the transceiver, the remaining battery life to the personal communication device.

7. The apparatus of claim 6, wherein measuring and transmitting the remaining battery life is performed by the processor in response to receiving the new dwell time.

8. A method, performed by a person detection device, for configuring a dwell time of the person detection device, comprising:
receiving a command from a personal communication device to change the dwell time;
receiving a new dwell time from the personal communication device;
in response to receiving the command and the new dwell time from the personal communication device, storing the new dwell time in a memory of the person detection device;
determining the presence of the person in the area;
determining an elapsed time since the transceiver previously transmitted a signal indicative of the presence of a person in the area; and
refraining from transmitting a new signal indicative of the presence of the person in the area when the processor determines that the elapsed time is less than the new dwell time.

9. The method of claim 8, further comprising:
determining a second elapsed time since the transceiver previously transmitted a second signal indicative of the presence of the person in the area; and
transmitting a second new signal indicative of the presence of the person in the area when the second elapsed time is greater than the new dwell time.

10. The method of claim 8, wherein the command comprises an instruction to increase or decrease the dwell time by a predetermined amount.

11. The method of claim 8, wherein the new dwell time comprises a time period.

12. The method of claim 11, further comprising:
comparing the time period to an upper dwell time threshold stored in a memory of the person detection device;
determining that the time period exceeds the upper dwell time threshold; and
transmitting an error message to the personal communication device when the time period exceeds the upper dwell time threshold.

13. The method of claim 8, further comprising:
measuring a remaining battery life of a battery used to power the person detection device; and
transmitting the remaining battery life to the personal communication device.

14. The method of claim 13, wherein measuring and transmitting the remaining battery life is performed in response to receiving the new dwell time.

* * * * *